United States Patent [19]

Mizuno et al.

[11] 4,379,536

[45] Apr. 12, 1983

[54] MEANS FOR RETAINING A ROD-SHAPED MATERIAL

[75] Inventors: Yoshiro Mizuno; Akihiko Kitamura, both of Aichi, Japan

[73] Assignee: Kojima Puresu Kogyo Kabushiki Kaisha, Aichi, Japan

[21] Appl. No.: 241,673

[22] Filed: Mar. 9, 1981

[30] Foreign Application Priority Data

Mar. 11, 1980 [JP] Japan .............................. 55-31317[U]

[51] Int. Cl.³ .............................................. F16L 3/08
[52] U.S. Cl. .................................. 248/73; 24/213 CS; 403/397
[58] Field of Search .................... 248/73, 74 A, 220.2, 248/221.3, 221.4, 226.5, 74 R, 74 B, 74 PB, 248/67.5, 239; 24/263 R, 213 CS; 403/397, 399

[56] References Cited

U.S. PATENT DOCUMENTS

| 470,698 | 3/1892 | Murdock | 248/74 R |
| 505,215 | 9/1893 | Buffinton | 248/67.5 |
| 2,011,138 | 8/1935 | Austin | 248/74 R |
| 3,042,352 | 7/1962 | Stamper | 248/73 X |
| 3,894,706 | 7/1975 | Mizusawa | 248/73 X |
| 3,944,177 | 3/1976 | Yoda | 248/73 X |
| 4,119,285 | 10/1978 | Bisping et al. | 248/73 X |
| 4,267,994 | 5/1981 | Lynch et al. | 248/74 R X |

Primary Examiner—William H. Schultz
Assistant Examiner—Ramon O. Ramirez
Attorney, Agent, or Firm—Dennison, Meserole, Pollack & Scheiner

[57] ABSTRACT

A means for retaining a rod-shaped material, such as a cable, wire and pipe. The means includes a mounting body adapted for accommodating of the rod-shaped material; and a clip of U-shaped configuration having two leg members for insertion into the slits.

15 Claims, 5 Drawing Figures

MEANS FOR RETAINING A ROD-SHAPED MATERIAL

BACKGROUND OF THE INVENTION

1. Field of the Invention

This invention relates to a means for retaining a rod-shaped material such as a cable, wire and pipe, and more particularly, it relates to a means for retaining a rod-shaped material and relationship thereof to the base to which the material is retained.

2. Description of the Prior Art

When securing a cable to the base, for instance, of a heater control for automobiles, the prior art has proposed the use of a clamp metal having a portion of generally curved configuration for holding the cable thereunder and two opposed flat portions disposed at each side of the curved holding portion. The clamp is secured to the base using bolts through the two flat portions, or one bolt through one flat portion with the other portion being inserted into a guide hole made in the base.

As the clamp has two flat portions, the problems associated with this type of clamp include the necessity for an extra installing space other than the cable-passing space, as well as the reduced ease of installation and the increased cost.

In order to alleviate the above-mentioned disadvantages, the prior art has also proposed the use of a spring-steel clamp, which is generally of a semi-circular configuration and has two opposed installing leg portions at the lowermost end of the clamp. The clamp further includes two locking elements for precluding withdrawal of the clamp from the square hole provided in the base and a cable-catching pawl formed generally on the upper portion of the clamp for retaining the cable against axial movement. Retaining of the cable to the base is such that the locking elements are biased to the rear side of the base by the resilient force of the clamp leg portions.

The disadvantage associated with this spring-steel clamp is that while the clamp is formed of spring steel, it is necessary to use a considerable force and skill for insertion of the clamp into the square hole of the base. To this end, a suitable tool is employed for insertion of a clamp to secure the cable.

In view of the general tendency for vehicles to use plastics for such a base, in trying to meet the requirement for lighter weight of vehicles, some stress will concentrate at the contacting area between the locking element and the base, and thus the plastic portion is likely to be damaged due to the stress, or broken due to the vibration. Generally, a metal washer is inserted between the locking element and the base in order to avoid the drawback, and thus there arises another problem that the number of parts and steps to be used is increased.

It is important to note that while these two clamps discussed above are provided on their cable-holding portion with a locking pawl for prevention of cable withdrawal, the cable is blocked for its rotation, and therefore, it is necessary to install the cable twistingly to the vehicle component and sometimes difficult to properly route it.

SUMMARY OF THE INVENTION

An object of the present invention is to provide a novel means for retaining a rod-shaped material to a vehicle component which alleviates the above-mentioned disadvantages associated with the prior art.

Another object of the present invention is to provide a means for retaining a rod-shaped material readily to a vehicle component without using any screws and tools, wherein the rod-shaped material is positively retained against axial movement thereof.

BRIEF DESCRIPTION OF THE DRAWINGS

In the accompanying drawings, there is shown a preferred embodiment of the invention.

DETAILED DESCRIPTION OF THE PREFERRED EMBODIMENT

Figure 1:
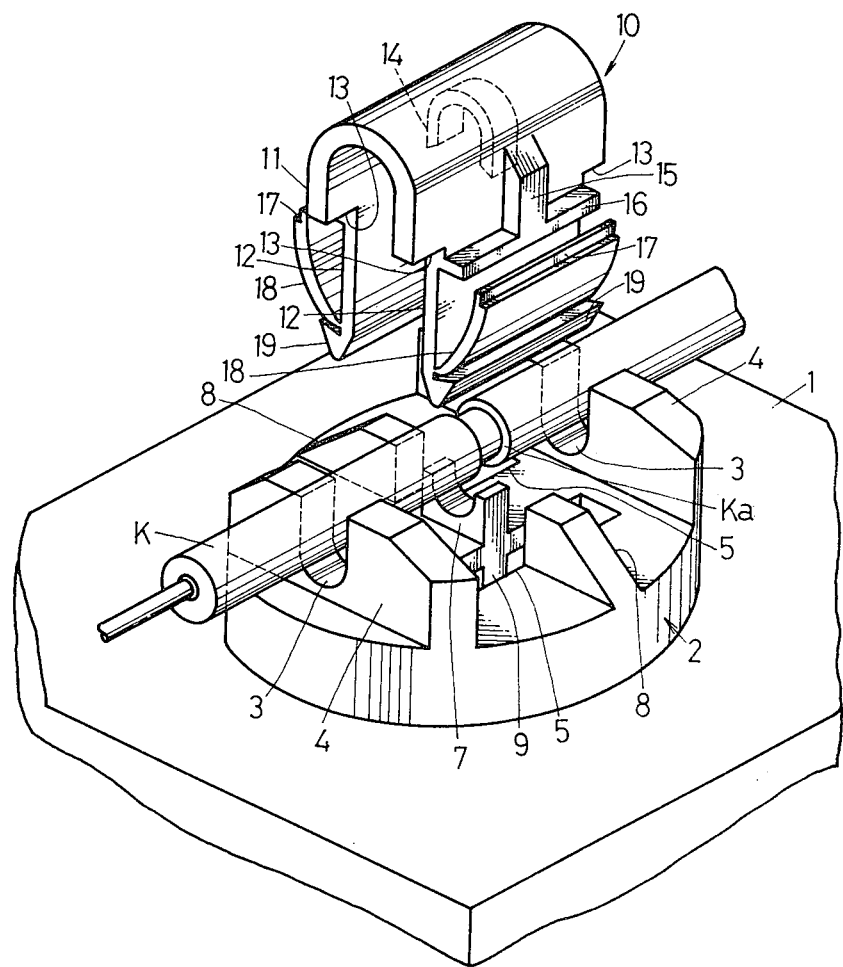
FIG. 1 is a perspective view of the retaining means with the mounting body and the clip portion being removed.

Referring now to the drawings, shown there is a preferred embodiment according to the invention adapted for retaining a cable K for a heater control found in automobiles. Reference numeral 1 is a base which is made of plastics and fixedly connected to the predetermined position of a vehicle body. The base 1 is provided thereon with a circular mounting body 2 formed integrally with the base 1. The mounting body 2 includes, at opposed ends thereacross, two pedestals 4 with a slot 3 for accommodating the cable K therein. The mounting body 2 also includes two elongated slits 5 disposed parallel to the cable K and defined in the central top surface thereof and at the distance substantially equal to the diameter of the cable K. Between the slits 5, the mounting body 2 is provided with a first retaining element 7 engaged with and rotatably supporting an annular groove Ka formed on the outer periphery of the cable K and adapted for retaining the cable K against axial movement.

The mounting body 2 further includes two supporting elements 8 formed thereon in opposed spaced relationship with each side of the first retaining element 7 and effective for holding both outer side of a clip 10 which will be described hereinafter.

Furthermore, on the central undersurface of the mounting body 2, there is provided a supporting element 9 disposed directly underneath the first retaining element 7 and extending downwardly therefrom in a manner which effectively prevents the distance between two leg members 12 of the clip 10 from becoming narrower.

Basically, the clip 10 is made of plastic material and is adapted for elastic locking engagement with the two slits 5 in the mounting body 2 in such a manner as to bridge the cable K. The clip 10 includes a holding portion 11 of generally U-shaped configuration (inverted U-shape as seen in the drawings) corresponding to the cable K, and two leg members 12 formed integrally with the holding portion 11 and extending from the lowermost ends of the U-shaped configuration.

The length of the holding portion 11 along the cable K is made slightly greater than the width of the legs 12 as well as the length of the slits 5, to provide thereunder a contacting face 13 against which abuts the top surface of the mounting body 2. Furthermore, on the arcuate surface of the central inner wall of the holding portion 11, there is provided a second retaining element 14 engaged with and rotatably supporting a portion of groove Ka of cable K and effective to positively retain the cable K against axial movement in cooperative relationship with the first retaining element 7 of the mounting body 2.

At the central lowermost portion of the both outer sides of the holding portion 11, there are provided each one of projections 15 for elastically abutting engagement with the supporting element 8 of the mounting body 2.

The right and left leg members 12 extending from both of the lowermost ends of U-shaped configuration of the holding portion 11 are so formed as to be inserted into the slits 5. The leg member 12 includes, on the outer surface of the lower portion thereof, an upwardly sloped locking pawl 18 which is resiliently deformable and provided at the uppermost free end thereof with an arresting face 17 which in turn engages with the lower edge of the slit 5.

The leg member 12 also includes at the lowermost end thereof a guide portion 19 which is generally of spire-like configuration. The leg member 12 further includes, on the outside face of the upper end thereof, a ridge 16 adapted to abut under pressure with one of inner faces of the slit 5 and molded integrally with the projection 15 of the holding portion 11 to form an inverted T-shaped configuration.

Having thusly described the present invention, its operation may now be described.

Figure 2:
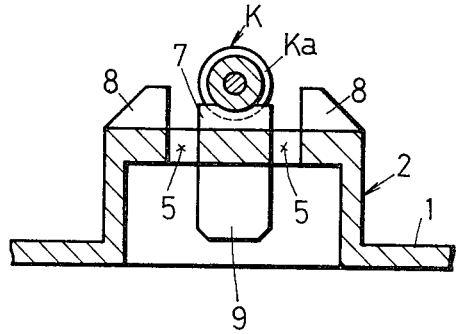
FIGS. 2 through 5 are front sectional views illustrating the steps of retaining of the rod-shaped material (cable) in a consecutive order.
Figure 3:
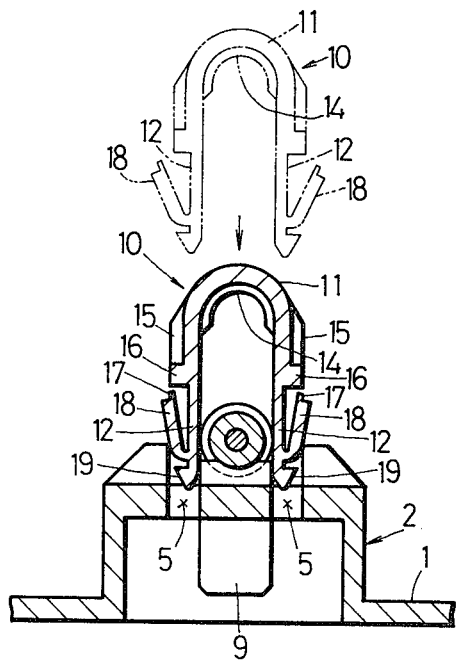
Figure 4:
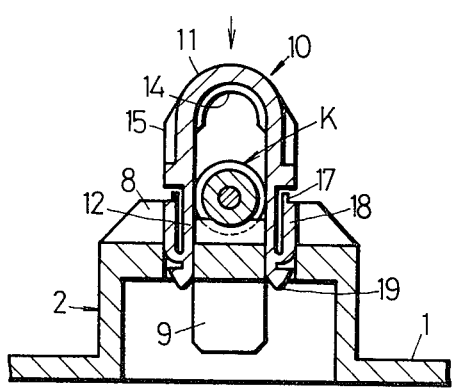

Firstly, the cable K is placed on the two pedestals 4 of the mounting body 2 with the groove Ka of the cable K being engaged with the first retaining element 7 of the mounting body 2, as seen in FIG. 2. The two leg members 12 of the clip 10 are then downwardly forced toward the two slits 5 of the mounting body 2 to thereby move the locking pawls 18 past the slits 5 while being resiliently deformed by the supporting elements 8, as is clearly shown in FIG. 4.

Figure 5:
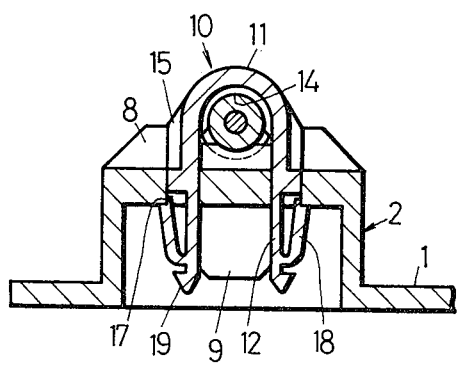

Downward force is further applied until the contacting faces 13 of the clip 10 abut on the top surface of the mounting body 2, as shown in FIG. 5, to thereby cause the arresting faces 17 to engage with the lower edge of the slits 5. At this point, the second retaining portion 14 formed on the holding portion 11 of the clip 10 engages with the groove Ka of the cable K. Thus, the cable K is securely attached to the desired position of the mounting body 2.

It will be appreciated that the mounting body 2 and the clip 10 are combined in such a manner that the groove Ka of the cable K is securely engaged with the first and second retaining elements 7 and 14. Under the condition, the cable K may be securely attached to the desired position of the mounting body 2, so long as the clip 10 may not be broken by an external force applied in every direction toward the cable K.

Furthermore, the two leg members 12 of the clip 10 are supported by the supporting element 9, to thereby positively prevent the disengagement of the two locking pawls 18 with the two slits 5, because there is no possibility for the distance between two leg members 12 to be curvedly deformed and narrowed, for instance, by possible heat or the like applied thereto.

It is important to note that the groove Ka of the cable K is rotatably engaged with the first and second elements 7 and 14 so that if the foremost end of the cable K is orientated in any desired direction, the very cable K may be likewise rotated smoothly relative to the first and second retaining elements 7 and 14.

It is also to be noted while the present invention is particularly described as a means with the mounting body 2 being provided with the first retaining element 7, and the clip 10, with the second retaining element 14, both for preventing the axial movement of the cable K, it is not essentially limited in this respect. Either one of the mounting body 2 and the clip 10 may be provided with a suitable retaining member for preventing such an axial movement of the cable K.

In addition, the present invention is not essentially limited for use in cables. Other rod-shaped materials such as wires and pipes may be likewise retained.

What is claimed is:

1. For use in the support and retention of a rod-shaped material, having an annular groove peripherally thereabout, solely for rotational movement:
    a mounting body having a top surface with a pair of laterally spaced slits defined therethrough, said mounting body being adapted to receive and support the rod-shaped material in overlying relation to said top surface between said slits;
    a clip having a holding portion formed in generally U-shaped configuration for accommodation of said rod-shaped material therein, and a pair of depending leg members extending from said U-shaped holding portion and insertable through said top surface into said slits to the opposite sides of a body-supported rod-shaped material, each of said leg members having a resilient locking pawl extending from its lower end remote from said U-shaped configuration for resilient securing engagement with said slit, each locking pawl terminating in a free end and including an arresting face at the free end adapted to engage with the lower edge of the corresponding slit upon insertion of the leg member into the slit to preclude withdrawal of said pawl; and
    at least one of said mounting body and said clip having a retaining element projecting therefrom for engagement with the annular groove formed on the periphery of said rod-shaped material.

2. A retaining means as defined in claim 1 wherein each of said leg members, adjacent said U-shaped holding portion includes a ridge extending laterally outwardly therefrom for movement restricting engagement within the corresponding slit.

3. A retaining means as defined in claim 1 wherein said mounting body includes a supporting element positioned between said slits and depending therebelow for engagement of said leg members thereagainst when said leg members are inserted into said slits.

4. A retaining means as defined in claim 1 wherein said mounting body includes at least one pedestal projecting upwardly from said top surface and having an upwardly directed recess for accommodating said rod-shaped material therein.

5. A retaining means as defined in claim 1 wherein said pedestal is oriented transversely of said pair of slits with the pedestal recess aligned between said slits.

6. A retaining means as defined in claim 5 including a second pedestal with an upwardly directed recess for accommodating said rod-shaped material, one pedestal being positioned immediately beyond each end of said pair of slits.

7. A retaining means as defined in claim 6 including a second retaining element, said second retaining element projecting from the other one of said mounting body and said clip in opposed relation to the first-mentioned retaining element for similar extension into the annular groove on the periphery of said rod-shaped material.

8. A retaining means as defined in claim 7 wherein one of said retaining elements is rigid with and projects vertically upward from said top surface, between said slits, for reception within the annular groove on the periphery of said rod-shaped material.

9. A retaining means as defined in claim 8 wherein the other of said retaining elements is rigid with said U-shaped configuration, extends transversely and conforms to the shape thereof, and depends therefrom for reception within the annular groove on the periphery of said rod-shaped material.

10. A retaining means as defined in claim 1 wherein said retaining element is rigid with and projects vertically upward from said top surface, between said slits, for reception within the annular groove on the periphery of said rod-shaped material.

11. A retaining means as defined in claim 1 wherein said retaining element is rigid with said U-shaped configuration, extends transversely and conforms to the shape thereof, and depends therefrom for reception within the annular groove on the periphery of said rod-shaped material.

12. A retaining means as defined in claim 1 wherein each locking pawl of said clip diverges upwardly from the lower end of the corresponding leg member in outwardly positioned overlying relation to the leg member.

13. For use in the support and retention of a rod-shaped material, having an annular groove peripherally thereabout, solely for rotational movement:
  a mounting body having a top surface with a pair of laterally spaced slits defined therethrough, said mounting body being adapted to receive and support the rod-shaped material in overlying relation to said top surface between said slits;
  a clip having a holding portion formed in generally U-shaped configuration of accommodation of said rod-shaped material therein, and a pair of depending leg members extending from said U-shaped holding portion and insertable through said top surface into said slits to the opposite sides of a body-supported rod-shaped material, each of said leg members having an resilient locking pawl extending from its lower end remote from said U-shaped configuration for resilient securing engagement with said slit;
  each of said leg members, adjacent said U-shaped holding portion, including a ridge extending laterally outwardly therefrom for movement restricting engagement within the corresponding slit; and
  at least one of said mounting body and said clip having a retaining element projecting therefrom for extension into the annular groove formed on the periphery of said rod-shaped material, whereby said rod-shaped material is held on said mounting body in a manner preventing axial movement thereof while permitting rotational movement about the axis thereof.

14. For use in the support and retention of a rod-shaped material, having a annular groove peripherally thereabout, solely for rotational movement:
  a mounting body having a top surface with a pair of laterally spaced slits defined therethrough, said mounting body being adapted to receive and support the rod-shaped material in overlying relation to said top surface between said slits;
  a clip having a holding portion formed in generally U-shaped configuration for accommodation of said rod-shaped material therein, and a pair of depending leg members extending from said U-shaped holding portion and insertable through said top surface into said slits to the opposite sides of a body-supported rod-shaped material, each of of said leg members having a resilient locking pawl extending from its lower end remote from said U-shaped configuration for resilient securing engagement with said slit;
  said mounting body including a supporting element positioned between said slits and depending therebelow for engagement of said leg members thereagainst when said leg members are inserted into said slits; and
  at least one of said mounting body and said clip having a retaining element projecting therefrom for extension into the annular groove formed on the periphery of said rod-shaped material, whereby said rod-shaped material is held on said mounting body in a manner preventing axial movement thereof while permitting rotational movement about the axis thereof.

15. For use in the support and retention of a rod-shaped material, having an annular groove peripherally thereabout, solely for rotational movement:
  a mounting body having a top surface with a pair of laterally spaced slits defined therethrough, said mounting body being adapted to receive and support the rod-shaped material in overlying relation to said top surface between said slits;
  a clip having a holding portion formed in generally U-shaped configuration for accommodation of said rod-shaped material therein, and a pair of depending leg members extending from said U-shaped holding portion and insertable through said top surface into said slits to the opposite sides of a body-supported rod-shaped material, each of said leg members having a resilient locking pawl extending from its lower end remote from said U-shaped configuration for resilient securing engagement with said slit;
  said mounting body including at least one pedestal projecting upwardly from said top surface and having an upwardly directed recess for accommodating said rod-shaped material therein; and
  at least one of said mounting body and said clip having a retaining element projecting therefrom for extension into the annular groove formed on the periphery of said rod-shaped material, whereby said rod-shaped material is held on said mounting body in a manner preventing axial movement thereof while permitting rotational movement about the axis thereof.

* * * * *